(12) United States Patent
Baltrusaitis et al.

(10) Patent No.: US 7,506,889 B2
(45) Date of Patent: Mar. 24, 2009

(54) TOW-BAR MOUNT FOR A HMMWV OR OTHER VEHICLE

(75) Inventors: David T. Baltrusaitis, Mehoopany, PA (US); Mark J. Sarti, Pittston, PA (US)

(73) Assignee: IBIS TEK, Butler, PA (US)

( * ) Notice: Subject to any disclaimer, the term of this patent is extended or adjusted under 35 U.S.C. 154(b) by 156 days.

(21) Appl. No.: 11/707,640

(22) Filed: Feb. 15, 2007

(65) Prior Publication Data

US 2008/0116661 A1    May 22, 2008

Related U.S. Application Data

(60) Provisional application No. 60/859,636, filed on Nov. 16, 2006.

(51) Int. Cl.
*B60D 1/56* (2006.01)

(52) U.S. Cl. .................. 280/502; 280/493; 280/491.1; 280/495; 224/515

(58) Field of Classification Search ................ 280/495, 280/498, 500, 502, 491.4, 491.1; 224/511, 224/512, 513, 514, 515, 536, 558, 570, 488, 224/489, 516, 924
See application file for complete search history.

(56) References Cited

U.S. PATENT DOCUMENTS

| | | | | | |
|---|---|---|---|---|---|
| 5,356,166 | A | * | 10/1994 | Hahne et al. | 280/491.4 |
| 5,887,461 | A | * | 3/1999 | Heffley | 70/18 |
| 7,334,968 | B2 | * | 2/2008 | Stankus et al. | 405/288 |

* cited by examiner

*Primary Examiner*—Paul N Dickson
*Assistant Examiner*—Tashiana Adams
(74) *Attorney, Agent, or Firm*—Ware, Fressola, Van Der Sluys & Adolphson LLP

(57) ABSTRACT

A mount for holding a tow-bar having pivotally attached arms, attachable to a vehicle such as a HMMWV 1114 (the up-armored HMMWV), for holding the tow-bar outside the vehicle. A kit is also provided including materials and hardware for making the mount and including hardware for attaching the mount to the front bumper of a vehicle, and in particular for attaching the mount to the front bumper of a HMMWV 1114.

6 Claims, 8 Drawing Sheets

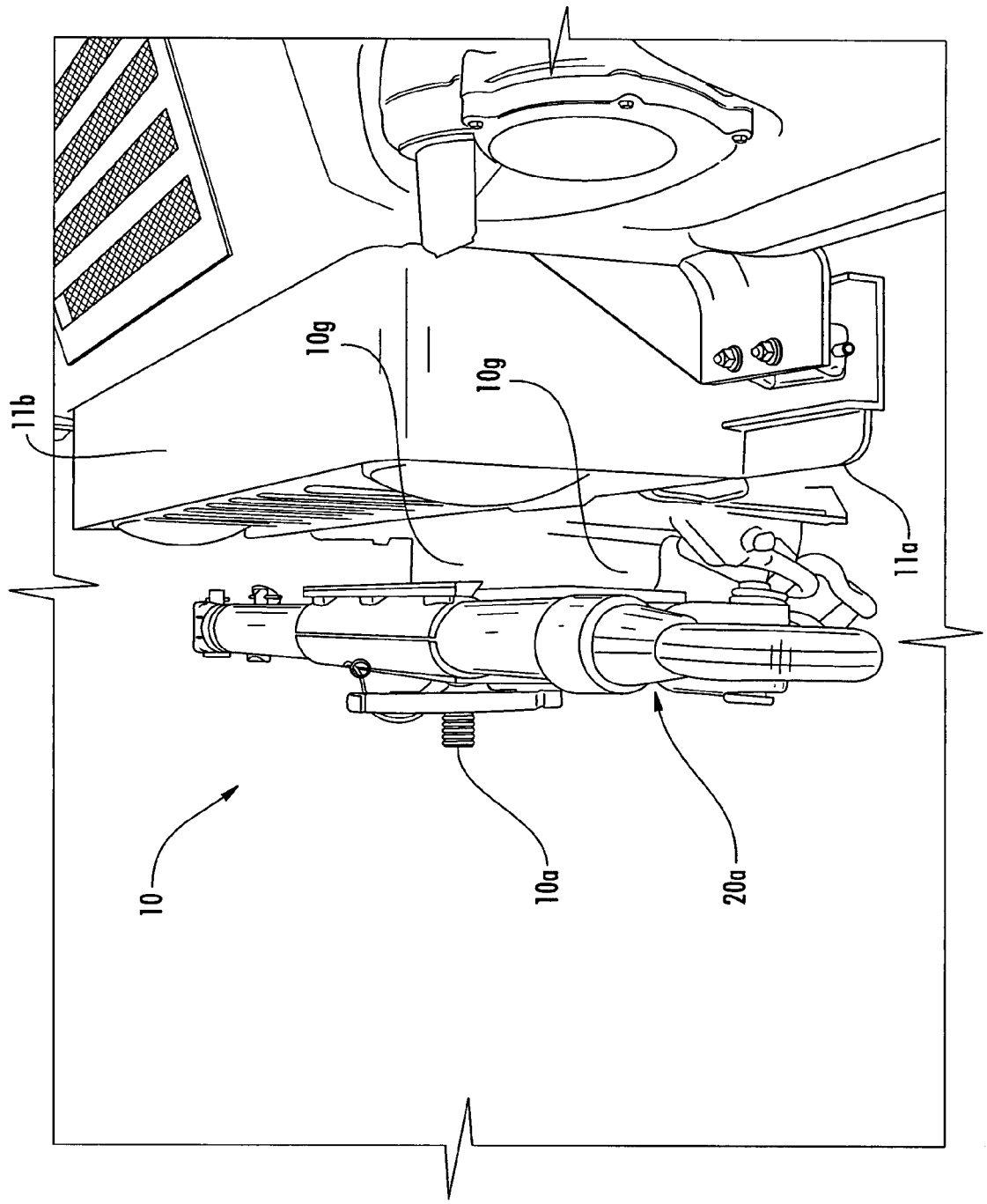

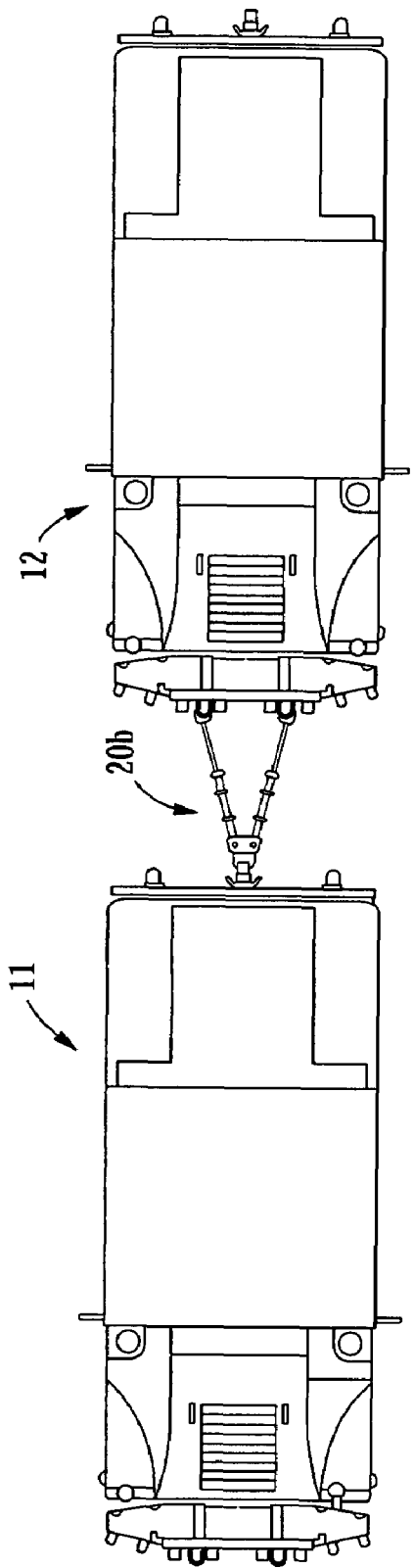
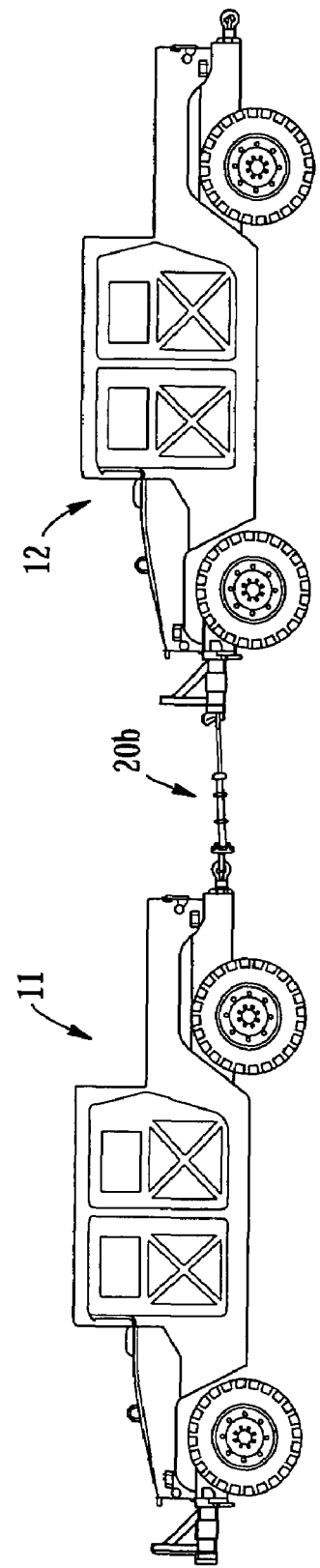

TOW-BAR MOUNT FOR A HMMWV OR OTHER VEHICLE

CROSS REFERENCE TO RELATED APPLICATION

Reference is made to and priority claimed from U.S. provisional application Ser. No. 60/859,636 filed on Nov. 16, 2006.

FIELD OF THE INVENTION

The present invention pertains to the field of accessories or special equipment for vehicles, and more particularly to a mount for a tow-bar for a vehicle such as the HMMWV used by the US military.

BACKGROUND OF THE INVENTION

While stationed in Iraq with the US Army at an assignment that required they use a High Mobility Multipurpose Wheeled Vehicle (HMMWV) 1114 (the up-armored version of the HMMWV), the inventors experienced difficulty in trying to stow their gear and equipment in the hatch of the vehicle. The need for a spare tire, tow-bar, tools, and slave cable takes much of the hatch space. The tow-bar is a particularly large object and is irregular in shape. Because of this it is cumbersome, and so getting the tow-bar out of the hatch takes a lot of time and some concentrated effort, and so is dangerous in a hostile environment.

The inventors determined that what is needed is a way to carry the tow-bar outside the hatch of the vehicle to save space in the hatch, and ideally in a way that reduces the time and makes it easier to put the tow-bar in use.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In a first aspect of the invention, a mount for holding a tow-bar having two arms (such as the tow-bar for the HMMWV 1114) is provided, comprising: two partial holding means having two cavities formed when the two partial holding means are joined together in a sandwich configuration, wherein the two cavities are of a size and orientation suitable for holding the two arms of the tow-bar; means for joining the two partial holding means in a sandwich configuration; and attaching means coupled to one of the two partial holding means, for attaching the mount to the outside of a vehicle.

In accord with the first aspect of the invention, the two partial holding means may comprise: a base plate having two sections of pipe cut lengthwise approximately in half so as to have an open side, and welded to a tow-bar side of the base plate so as to expose the open side and oriented to receive the two arms of the tow-bar; and a face plate having two sections of pipe cut lengthwise approximately in half so as to have an open side, and welded to a tow-bar side of the face plate so as to expose the open side and oriented to receive the two arms of the tow-bar.

BRIEF DESCRIPTION OF THE DRAWINGS

The above and other objects, features and advantages of the invention will become apparent from a consideration of the subsequent detailed description presented in connection with accompanying drawings, in which:

FIGS. 1A and 1B are perspective views of a standard issue tow-bar for a HMMWV 1114 held in a mount according to the invention and attached to the front of the vehicle.

FIGS. 2A and 2B are a top view and a side view, respectively, of a towing HMMWV coupled to a towed HMMWV using a tow-bar of another sort for which the invention provides a mount, a sort having telescoping arms, and showing the tow-bar attached to a special bumper used with the HMMWV (not provided as standard equipment).

DETAILED DESCRIPTION

The invention provides a mount for a tow-bar having two pivotally-attached arms, a mount that can be attached to various locations on a vehicle. The tow-bar is for example the kind used by the HMMWV 1114 (up-armored HMMWV).

The invention will first be described for an embodiment used with the HMMWV 1114, an embodiment in which the mount is attached to the front of the vehicle, in front of the radiator (but below the air intakes). It is to be understood though that the invention encompasses attaching the mount to other locations on the HMMWV 1114, and also encompasses attaching the mount to other variants of the HMMWV. Finally, the invention is of use with any vehicle that uses a tow-bar having two pivotally-attached arms, i.e. the invention provides a mount adapted for a particular tow-bar, not a particular vehicle.

Figure 1A:
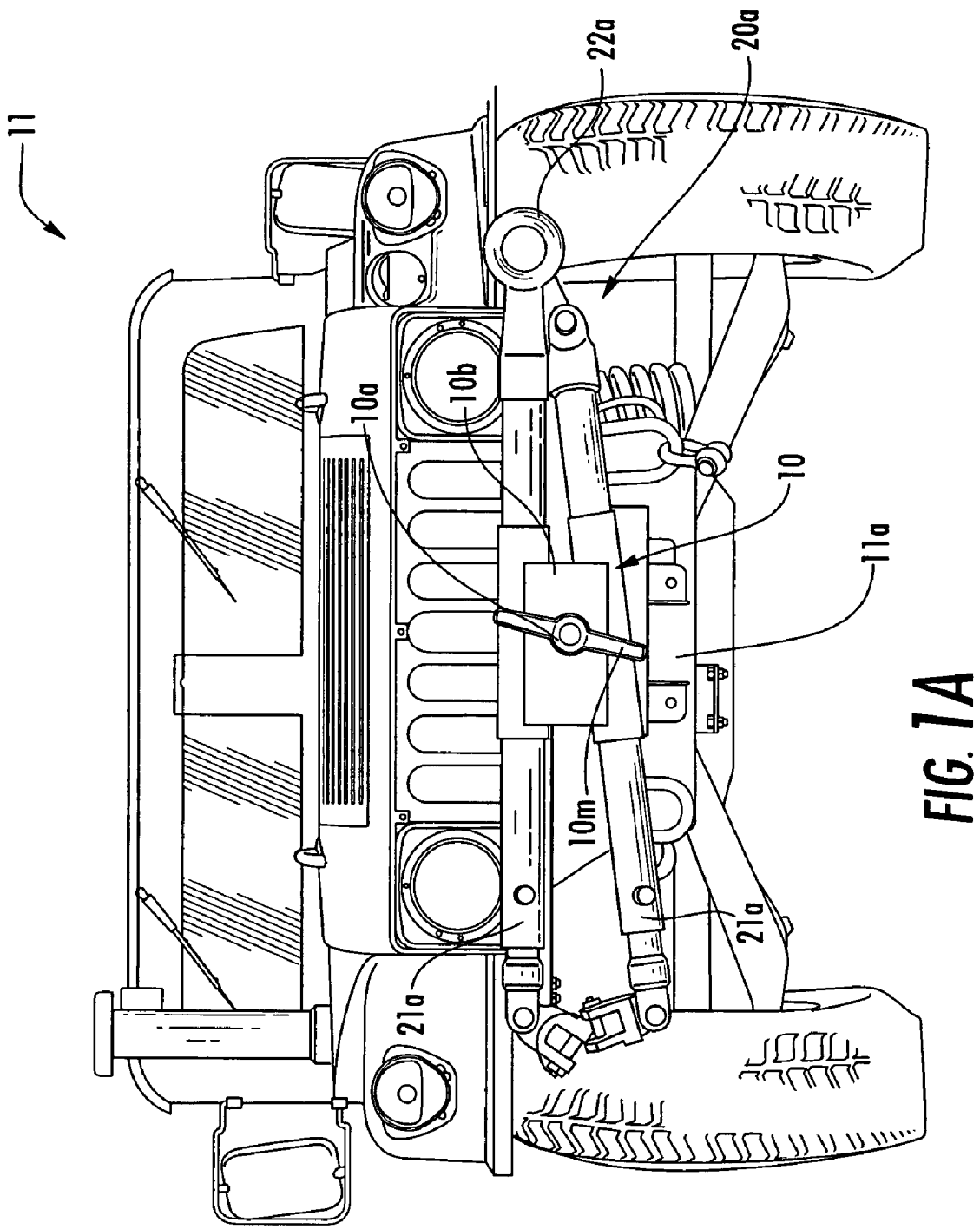

Referring to FIGS. 1A and 1B, a standard issue tow-bar 20a for a HMMWV (model 1114) 11 is shown held in a mount 10 according to an embodiment of the invention. The mount is attached to the front bumper of the HMMWV, below air intakes for the radiator. Having the tow-bar out in front of the radiator has as an advantage that it protects the HMMWV when having to shove obstructing vehicles out of the way.

The standard issue tow-bar 20a shown in FIGS. 1A and 1B has two arm members 21a that join pivotally at an end having a heavy-gauge eyelet/ring hitch 22a, for placing on a pintle hitch on the rear of the HMMWV. The pivotally attached arm members swing away from each other away when attaching to attach points on (usually the front bumper of) a vehicle to be towed. As can be seen, when the tow-bar is in a stowed configuration, with the arms closed together to the maximum extent possible, the arms are not parallel; the ends away from the eyelet are further apart then the ends near the eyelet. This is in part why the tow-bar is so cumbersome.

Referring to FIG. 2A and FIG. 2B, a tow-bar 20b of a type for which the invention provides a mount is shown attached to the rear end of a towing HMMWV 11 and attached to a special (not standard) front bumper on a towed HMMWV 12, available from Ibis Tek, of Butler, Pa. The special bumper includes space for stowing gear, and is designed to withstand a substantial force of impact (useful in case of having to ram a vehicle intentionally positioned on a road to block the way).

Figure 3A:
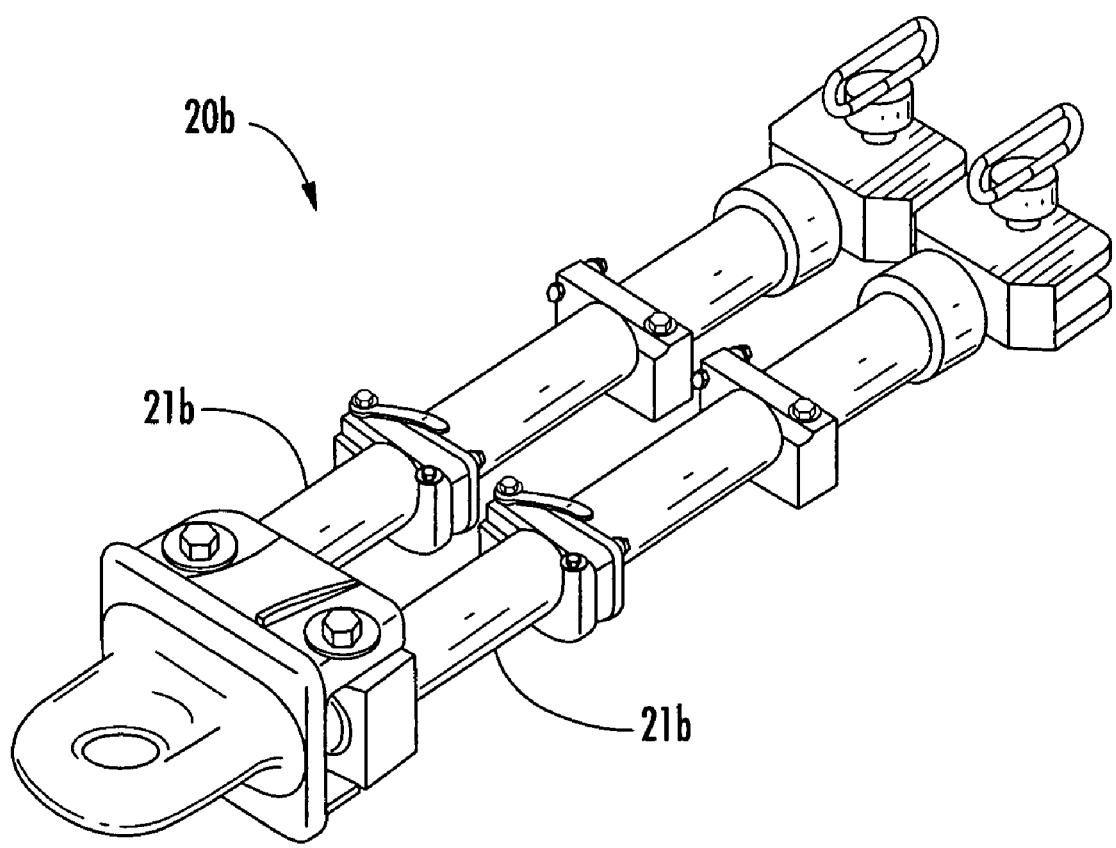
FIG. 3A is a perspective view of the tow-bar of FIGS. 2A and 2B shown in a stowed configuration, with the telescoping arms retracted and the arms pulled together.
Figure 3B:
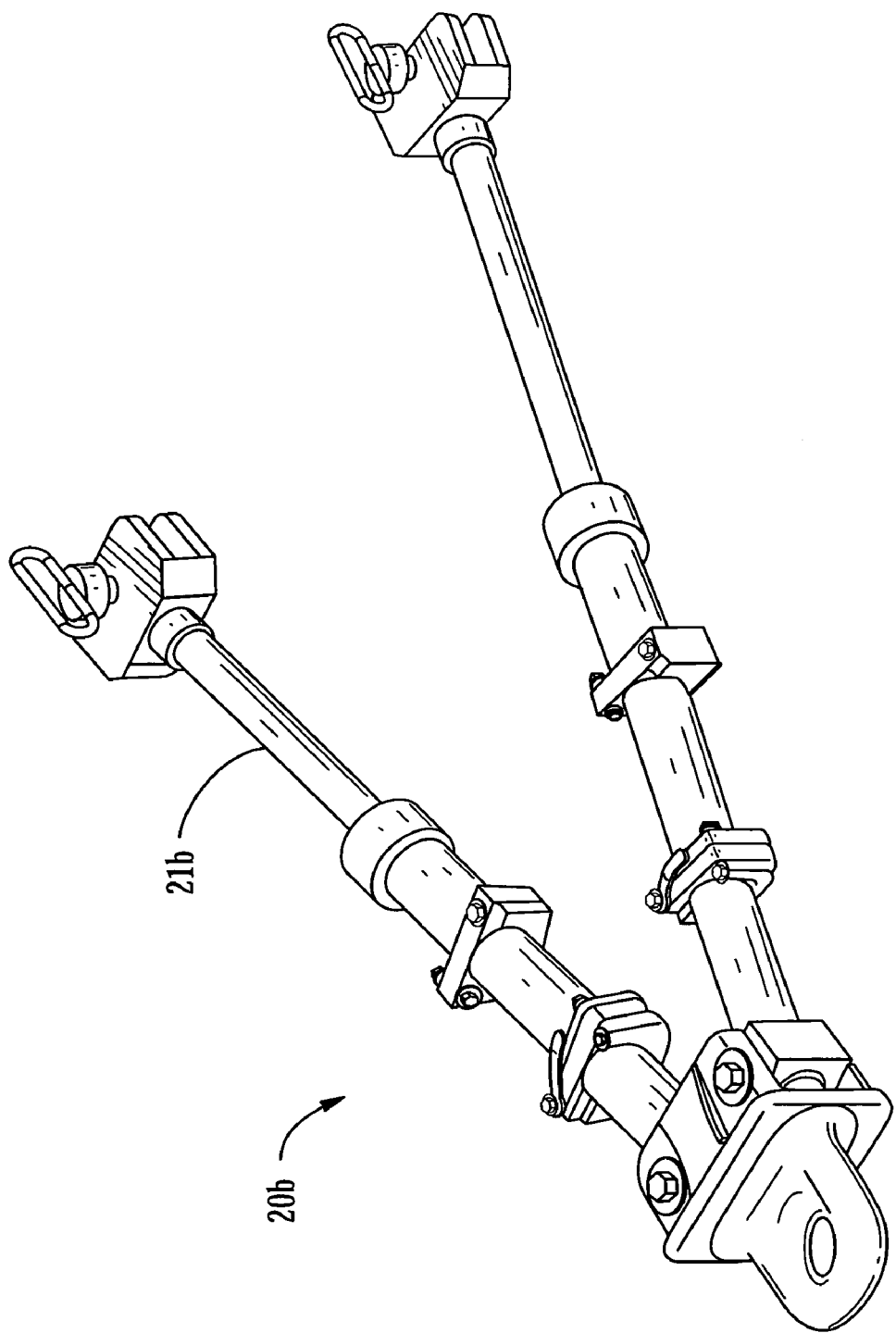
FIG. 3B is a perspective view of the tow-bar of FIGS. 2A and 2B in a deployed configuration.

Referring now to FIGS. 3A and 3B, the tow-bar 20b of FIGS. 1A and 1B is shown as having pivotally attached arm members 21b, but which are parallel in a stowed position and are telescoping arms that retract to reduce the space needed to stow the tow-bar, as shown in FIG. 3A. The tow-bar 20b of FIGS. 3A and 3B is a special tow-bar, available from Ibis Tek, of Butler, Pa. In FIG. 3A the tow-bar system is shown in a stowed configuration. In FIG. 3B, it is shown with the telescoping arm members extended. The telescoping arm members 21b are independent, i.e. either one can be extended or retracted independent of the position of the other.

Although the special tow-bar 20b takes less space than the standard issue tow-bar 20a and is less cumbersome on account of the arms stowing parallel, the mount provided by the invention can be used with either the special tow-bar or the standard issue tow-bar As will be clear from the description that follows, the invention uses a jack bolt 10a (FIGS. 1A and 1B) that protrudes between the two arms of the tow-bar. As long as there is a space between the two arms when the tow-bar is in its stowed configuration, as there is for both the standard issue tow-bar 20a and special tow-bar 20b, the mount provided by the invention can be used.

Figure 4A:
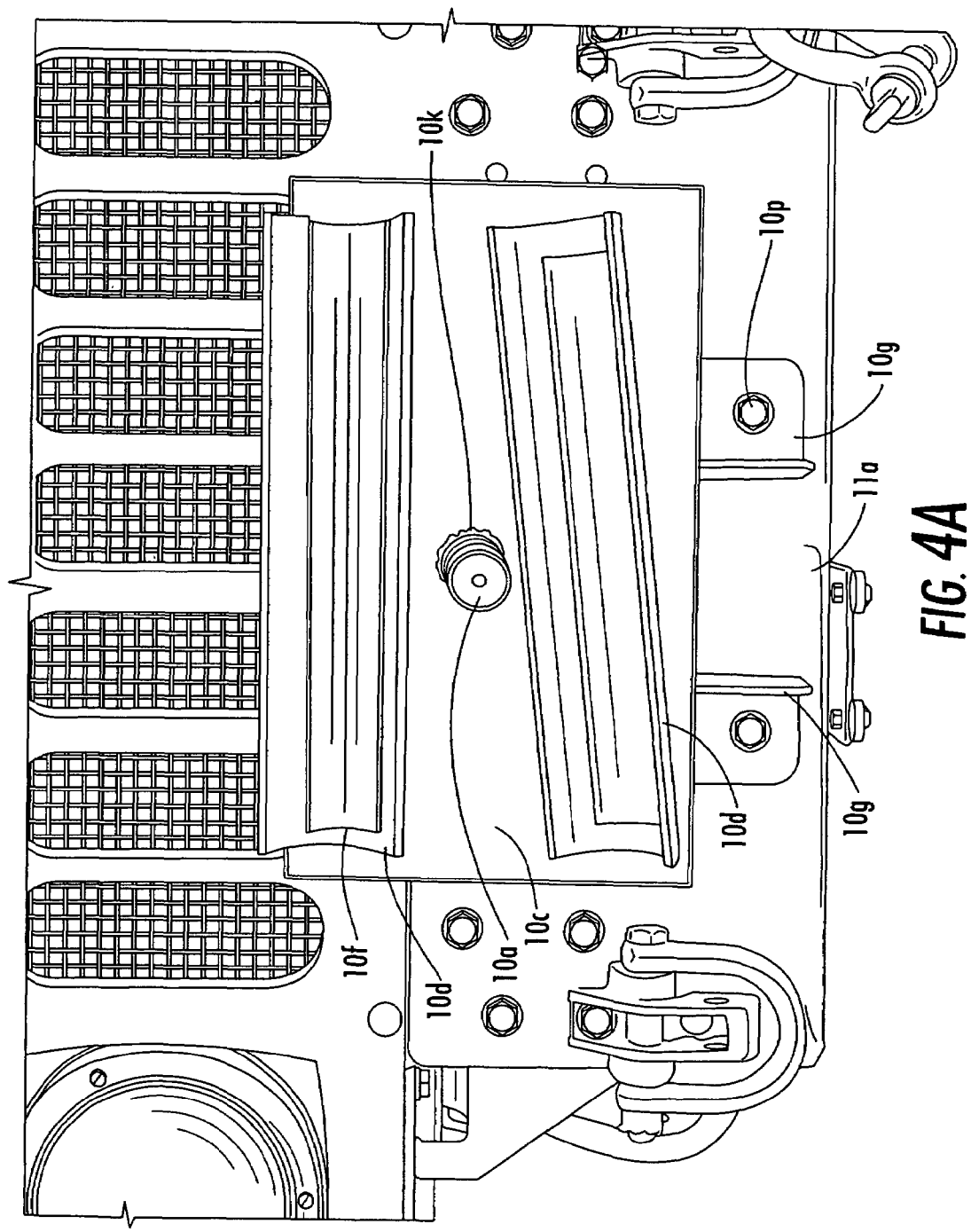
FIGS. 4A and 4B are a front and side view of a base plate portion of a mount according to the invention.
Figure 4B:
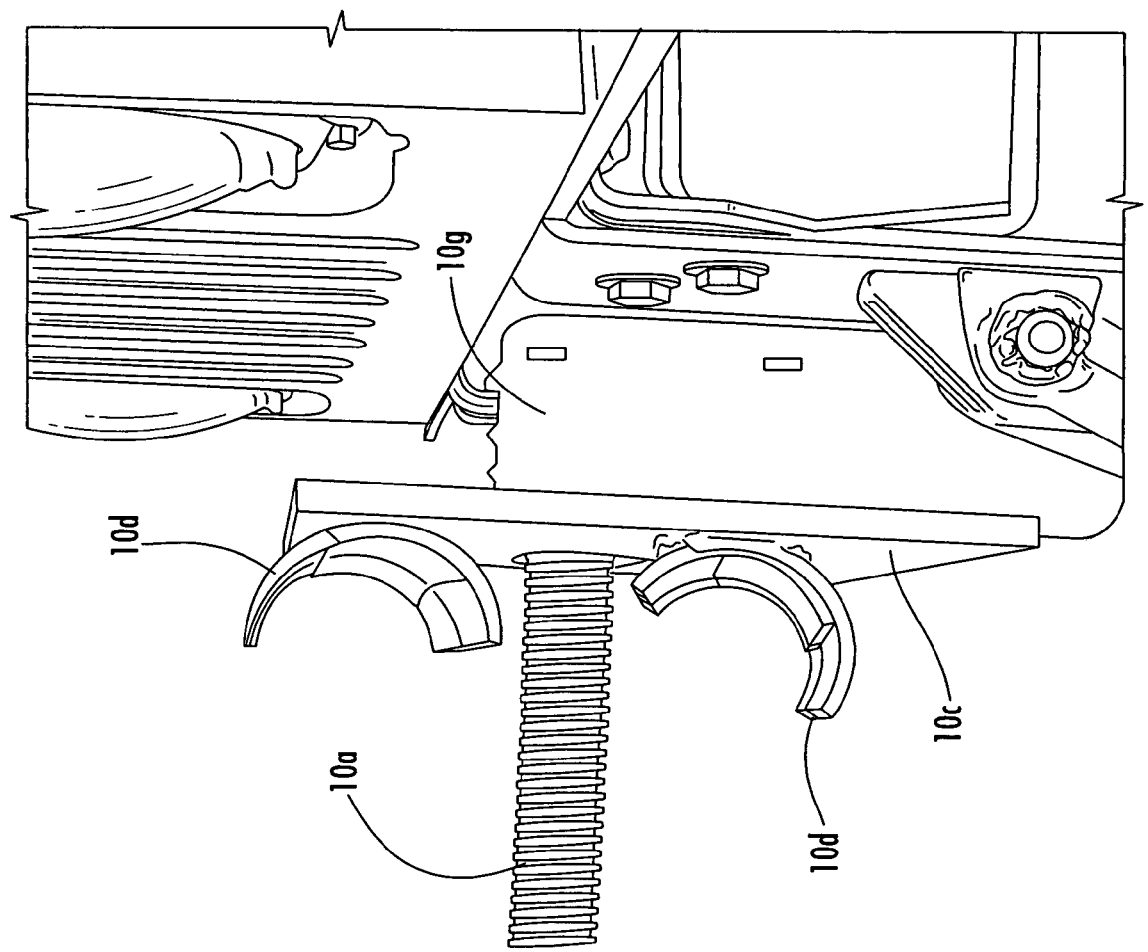
Figure 4C:
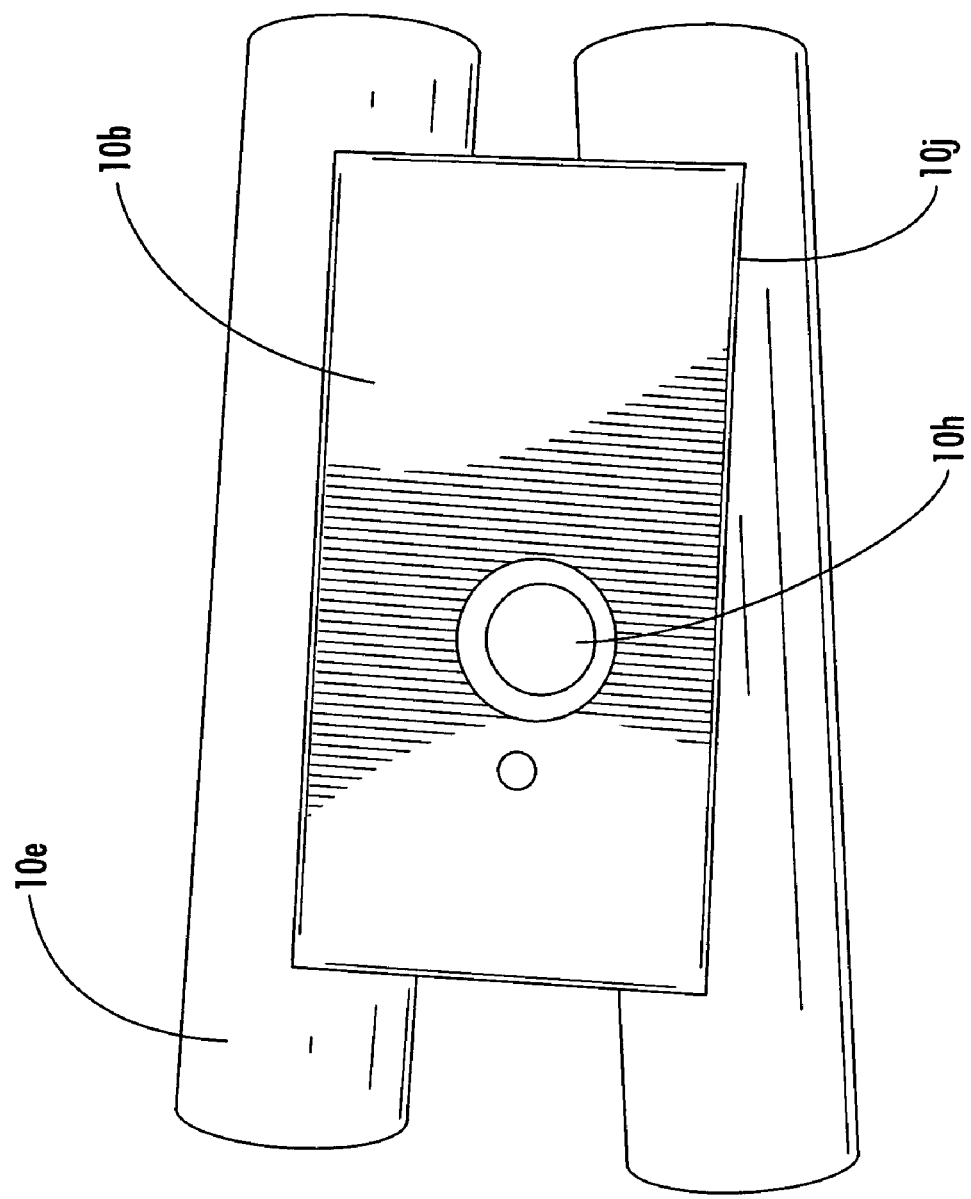
FIG. 4C is a face plate portion of the mount, which joins with the base plate portion of FIGS. 4A and 4B to hold the tow-bar in a sandwich arrangement.

Referring again to FIGS. 1A and 1B and now also to FIGS. 4A, 4B and 4C, a tow-bar mount 10 according to the invention is shown as including a base plate 10c to which two pipes 10d are welded after being cut lengthwise approximately in half. The inner diameter of the pipe is sufficient to accommodate the outer dimensions of the tow-bar (such as tow-bar 20a or special tow-bar 20b) to be held by the mount. Schedule 40 pipe is a good choice for a standard issue tow-bar. The mount also includes a face plate 10b (FIG. 4C) to which the other (approximate) halves of the pipe are welded. The welding produces weldments 10j, which need not extend the entire length of the pipe. The base plate 10c has a hole into which the jack bolt 10a is inserted and welded using a weldment 10k on the front of the base plate and another weldment (not shown) on the backside of the base plate. The face plate 10b has a hole 10h sufficient in diameter to allow the jack bolt to pass through with little or no contact. To hold the tow-bar 20a in the mount 10, the arms 21a of the tow-bar are placed in the half-pipes 10d on the base plate 10c, the face plate is then pushed onto the base plate so that the jack bolt 10a pierces the hole 10h in the face plate and the arms 21a of the tow-bar rest inside the half-pipes 10e on the face plate, and a jack nut 10m is screwed onto the jack bolt and tightened, thereby securing holding the tow-bar in a sandwich arrangement. To eliminate vibration, a cushioning material 10f, preferably self-adhering, is placed in the half-pipes 10d and 10e.

The embodiment described above was fashioned in the field in Iraq by the inventors, and the materials used reflect the chance availability of different possible hardware. Thus for example a jack bolt (used for jacking up a vehicle) was used; such a bolt is threaded along its entire length and therefore requires that the hole 10e in the face plate 10b have an inner diameter exceeding the outermost dimension of the jack bolt. Other means of holding the face plate to the base plate can be used. For example, a bolt threaded only partially along its length, at its tip, can of course be used.

The mount 10 provided by the invention is advantageously mounted at the front of the HMMWV, attached to the bumper, as in FIGS. 1A and 1B. The mount, however, can also be attached at other points on the HMMWV. For example, the mount can be attached on top of the front of the vehicle on the intake 11a for the radiator. The mount can even be attached to the back of the vehicle.

Referring again to FIGS. 1A, 1B, 4A and 4B, the mount 10 is shown in an application in which it is attached to the front bumper 11a of the HMMWV 11. To attach the mount to the HMMWV at such a location, it is advantageous to have the mount held in spaced apart relation from the vehicle. For this, two angle irons 10g (lengths of steel having an L-shaped cross section) are welded parallel to the back of the base plate 10c, so as to be vertical when the mount is attached to the HMMWV bumper. The angle irons are then attached to the bumper using bolts 10p (FIG. 4A). (The bottom corners of the angle irons can be rounded to eliminate sharp corners and so reduce risk of injury.)

For the embodiment of the invention shown in the FIG. 1A-B and FIGS. 4A-C, and as attached as shown there, the inventors used the following materials: 2 pieces of ¼×3×10" angle iron, 6⅝×2" grade 8 bolts with lock washers and nuts, ½×18×10" steel plate for use as the base plate, ¼×6×10" steel plate for use as the face plate, 2 pieces of 3½ schedule 40 pipe 16" long, 1×7" jack bolt with large wing nut, ⅜×4" quick pin, and 64" of ¼×1½" self stick foam with removable protective backing (which should be kept on until as indicated below).

To make the mount and attach it to the HMMWV, the following procedure can be used: Prepare the base plate for welding. Mark a plumb line (with the base plate held in the orientation in which it will be mounted onto the vehicle) down the base plate starting 1" from the top. Mark a hole center for the jack bolt 9⅝" from the right and 5½" up from the bottom. Cut a hole through the base plate to fit the 1" jack bolt. Weld both sides of the base plate to the jack bolt.

Next cut two lengths of the schedule 40 pipe to a length of 16", and then cut them in half lengthwise, splitting them into two half-cylinders. Take one of the half-cylinders, find the center of the pipe and weld it on center about 1" down from the top of the base plate. This is the top base half-cylinder.

Take the tow-bar and lay it on the partially-constructed mount with one arm in the top half-cylinder, centered, and the other arm lying on the base plate. Mark the center of the tow-bar to find the exact angle to place the second half-cylinder pipe. Center the second half-cylinder pipe on the plate, and rotate it so it will hold the other arm of the tow-bar. Tack-weld the second half-cylinder pipe to the base plate and double check the position. Once satisfied, weld the second half-cylinder pipe into place.

Place the jack bolt into the hole in the base plate, and plumb and weld both sides to the base plate.

Next make the face plate. First place the tow-bar into the base plate, then place the other pipe halves (half cylinders) onto the tow-bar completing the two sections of pipe, i.e. so as to form two whole cylinders. Depending on the pipe used, the bottom pipe might need to be trimmed because the radius of the pipe may be too large, resulting in a loose fit of the tow-bar. With the schedule 40 pipe, the inventors trimmed of about an inch from the circumference of the pipe, which resulted in a satisfactory fit.

Once satisfied with fit, take the 6×11" face plate, center it, and tack-weld it to the two free half-cylinders (lying on top of the two half-cylinders now welded to the base plate). Mark out the hole for the jack bolt; for a 1" jack bolt you can use a hole about 1¼ in diameter. After the hole is cut check the fit. Once satisfied with the fit, weld the face plate to the two free half-cylinders using three stitch welds about 3" long.

To eliminate vibration, place the self-adhering foam into the pipe halves on both the base plate and the face plate, but do so without removing the backing on the foam that covers the self-adhering surface. Place the tow-bar on the base plate and screw the face plate to the base plate by threading the wing nut onto the jack bolt, to a point where the tow-bar is secure. Make sure the tow-bar is held tightly enough to compress the foam.

Mark a spot on the face plate to the left of the wing nut and drill a 13/32" hole. Install a quick/holding pin into the hole. The quick pin will keep the wing nut from backing off the jack bolt.

Next, take the face plate off the base plate, remove the foam, and paint the face plate. Once the paint is dry, take the foam for the face plate, remove the backing to expose the self-adhering surface, and then place the foam into the pipe halves of the face plate.

The bumper already has six holes around the winch. Drill out these six holes to fit the bolts that will hold the base plate to the bumper, i.e. the bumper bolts. Keeping the tops of the angle irons flush with the top of the bumper, plumb and mark out holes on the exposed lower portion of the angle irons and drill them to accommodate the bumper bolts. Mount the angles to the bumper using the six bumper bolts. On the back of the base plate draw a line horizontally across the length of the base plate, 3" from the top. Hold the base plate on the angle irons so that the tops of the angle irons lies on the line on the base plate, and so that the base plate is centered on the vehicle. Double check, since the holes for the angle iron are not centered. When satisfied that the base plate is centered on the vehicle, tack-weld and double check. Then remove the mount from the vehicle, place it on a bench, and add weldments for strength.

An additional piece of angle iron can be used, to strengthen the mount: Take another piece of angle iron, position it on the base plate so that one side lies flat on the base plate and the other side abuts the tops of the two angle irons 10g. Then weld the additional piece of angle iron to the tops of the other angle irons 10g and to the base plate.

Finally, paint the base plate, and then put the foam in the base half-cylinders with the protective covering removed from the self-adhering surface.

The inventors tested the mount and found it to be satisfactory as both a mount and a bumper. The tow-bar does not impede anything on the vehicle and is in a very useful position.

It may be useful to taper the angle irons so the tops are tilted back toward the vehicle. This would help keep the tow-bar from falling out when the face plate is first removed, although even without such a tapering, the tow-bar did not fall out during testing.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A mount for holding a tow-bar having two arms, comprising:
   two partial holding means each having two members, each member dimensioned for receipt of a portion of one of the two arms of the tow-bar;
   means for joining the two partial holding means in a sandwich configuration so that the two members of one partial holding means are joined with the two members of the other partial holding means so as to form two cavities of a size and orientation suitable for holding the two arms of the tow-bar; and
   attaching means coupled to one of the two partial holding means, for attaching the mount to the outside of a vehicle.

2. A mount for holding a tow-bar having two arms, comprising:
   two partial holding means having two cavities formed when the two partial holding means are joined together in a sandwich configuration, wherein the two cavities are of a size and orientation suitable for holding the two arms of the tow-bar;
   means for joining the two partial holding means in a sandwich configuration; and
   attaching means coupled to one of the two partial holding means, for attaching the mount to the outside of a vehicle,
   wherein the two partial holding means comprise:
   a base plate having two sections of pipe cut lengthwise approximately in half so as to have an open side, and welded to a tow-bar side of the base plate so as expose the open side and oriented to receive the two arms of the tow-bar; and
   a face plate having two sections of pipe cut lengthwise approximately in half so as to have an open side, and welded to a tow-bar side of the face plate so as expose the open side and oriented to receive the two arms of the tow-bar.

3. A mount for holding a tow-bar having two arms. comprising:
   two partial holding means having two cavities formed when the two partial holding means are joined together in a sandwich configuration, wherein the two cavities are of a size and orientation suitable for holding the two arms of the tow-bar;
   means for joining the two partial holding means in a sandwich configuration; and
   attaching means coupled to one of the two partial holding means, for attaching the mount to the outside of a vehicle,
   wherein one of the two partial holding means includes a base plate having a tow-bar side and an opposite side, and wherein the other of the two partial holding means includes a face plate having a tow-bar side, and wherein the means for joining the two partial holding means in a sandwich configuration includes a bolt protruding from the tow-bar side of the base plate, a hole through the face plate sized so as to allow the bolt to pass therethrough, and a nut sized to thread onto the bolt and to hold the face plate to the base plate.

4. A mount for holding a tow-bar having two arms, comprising:
   two partial holding means having two cavities formed when the two partial holding means are joined together in a sandwich configuration, wherein the two cavities are of a size and orientation suitable for holding the two arms of the tow-bar:
   means for joining the two partial holding means in a sandwich configuration; and
   attaching means coupled to one of the two partial holding means, for attaching the mount to the outside of a vehicle,
   wherein one of the two partial holding means includes a base plate having a tow-bar side and an opposite side, and wherein the other of the two partial holding means includes a face plate having a tow-bar side, and wherein the attaching means includes two lengths of angle iron welded to the side of the base plate opposite the tow-bar side, in spaced apart and approximately parallel relation, so as to protrude from the base plate and expose at least one hole in each angle iron, for use in bolting the base plate to a vehicle.

5. A mount for holding a tow-bar having two arms, comprising:
- a base plate having a bolt protruding from a tow-bar side, and having two sections of pipe cut lengthwise approximately in half so as to have an open side, and welded to the tow-bar side of the base plate so as expose the open side and oriented to receive the two arms of the tow-bar;
- a face plate having a hole sufficient to allow the bolt to pass therethrough, and having two sections of pipe cut lengthwise approximately in half so as to have an open side, and welded to a tow-bar side of the face plate so as expose the open side and oriented to receive the two arms of the tow-bar; and
- a nut sized to thread onto the bolt protruding from the base plate and large enough to hold the face plate on the base plate in a sandwich arrangement;
- wherein the base plate also has two lengths of angle iron welded to the side of the base plate opposite the tow-bar side, in spaced apart and approximately parallel relation, so as to protrude from the base plate and expose at least one hole in each angle iron, for use in bolting the base plate to a vehicle.

6. A mount as in claim 1, further comprising foam material placed within one or more members of at least one partial holding means, the foam material positioned to contact the portion of one of the two arms of the tow-bar.

* * * * *

UNITED STATES PATENT AND TRADEMARK OFFICE
CERTIFICATE OF CORRECTION

| | |
|---|---|
| PATENT NO. | : 7,506,889 B2 |
| APPLICATION NO. | : 11/707640 |
| DATED | : March 24, 2009 |
| INVENTOR(S) | : Baltrusaitis et al. |

Page 1 of 1

It is certified that error appears in the above-identified patent and that said Letters Patent is hereby corrected as shown below:

In column 4, line 36 1 1/4 should be --1 1/4"--

Signed and Sealed this

Nineteenth Day of May, 2009

JOHN DOLL
*Acting Director of the United States Patent and Trademark Office*